United States Patent [19]

Kawamura et al.

[11] Patent Number: 5,472,033
[45] Date of Patent: Dec. 5, 1995

[54] PNEUMATIC TIRE WITH BELT CORDS COMPRISING FOUR STEEL MONOFILAMENTS ONE OR TWO OF WHICH ARE WAVED

[75] Inventors: Kazuhiko Kawamura, Akashi; Masato Komatsuki, Nishinomiya, both of Japan

[73] Assignee: Sumitomo Rubber Industries, Ltd., Hyogo, Japan

[21] Appl. No.: 972,920

[22] Filed: Nov. 6, 1992

[30] Foreign Application Priority Data

Nov. 21, 1991 [JP] Japan ................... 3-333907

[51] Int. Cl.⁶ ................ B60C 9/18; B60C 9/20
[52] U.S. Cl. ............ 152/527; 57/902; 152/526; 152/537
[58] Field of Search ............... 152/481, 527, 152/556, 537, 526; 57/200, 201, 206, 311, 902

[56] References Cited

U.S. PATENT DOCUMENTS

| | | | |
|---|---|---|---|
| 4,509,318 | 4/1985 | Yoneda | 57/902 X |
| 4,738,096 | 4/1988 | Hatakeyama | 152/451 X |
| 4,819,705 | 4/1989 | Caretta | 152/527 |
| 5,135,039 | 8/1992 | Mizuta et al. | 152/527 X |
| 5,319,915 | 6/1994 | Kobayashi et al. | 152/451 |

FOREIGN PATENT DOCUMENTS

| | | |
|---|---|---|
| 0146046 | 6/1985 | European Pat. Off. . |
| 0342644 | 11/1989 | European Pat. Off. ........ 152/527 |
| 0433962 | 12/1990 | European Pat. Off. . |
| 0462716 | 12/1991 | European Pat. Off. ........ 152/451 |
| 0515178 | 11/1992 | European Pat. Off. . |
| 1162885 | 6/1989 | Japan ........................... 57/902 |
| 9104370 | 4/1991 | WIPO . |

OTHER PUBLICATIONS

*Mechanics of Pneumatic Tires,* ed. Samuel Clark: US Dept. of Transportation, Aug. 1981, pp. 207–220, 874.
*Mechanics of Pneumatic Tires,* ed. Samuel Clark: US Dept. of Transportation, Aug. 1981, pp. 219, 881.

Primary Examiner—Adrienne C. Johnstone
Attorney, Agent, or Firm—Birch, Stewart, Kolasch & Birch

[57] ABSTRACT

A pneumatic tire which is provided radially outside a carcass (6) with a belt (9) made of cords (10) embedded in topping rubber, each of the belt cords comprises four steel monofilaments (12A and 12B) including one or two waved steel monofilaments (12A) and unwaved steel monofilaments (12B), the four steel monofilaments having the same diameters are compactly twisted together so as to make alternate contact portions and non-contact portions (P) with a gap (T) between at least one waved steel monofilament and the adjacent steel monofilaments, and the four steel monofilaments have the same diameter (d) of 0.2 to 0.35 mm.

7 Claims, 4 Drawing Sheets

PNEUMATIC TIRE WITH BELT CORDS COMPRISING FOUR STEEL MONOFILAMENTS ONE OR TWO OF WHICH ARE WAVED

The present invention relates to a belted pneumatic tire, in which the belt durability, steering stability and ride comfort are improved.

BACKGROUND OF THE INVENTION

In general, radial tires are provided with tread reinforcing belts. For such belts, a compact cord having a 1X3 structure has been widely used.

Such a 1X3 compact cord is composed of three steel monofilaments which are twisted together compactly. That is, no gap is formed between the adjacent filaments, as shown in FIG. 6. Therefore, a closed space (H) is formed at the center of the cord (A), and topping rubber (B) can not penetrate into this central space (H). As a result, the central part of the surface of the monofilament (F) is not covered by the topping rubber (B). The uncovered part is easily corroded by water which penetrates the tire tread portion from its damaged part. And the corrosion is liable to spread quickly through such a space (H), which greatly reduces the tire durability.

In order to avoid exposure of the steel monofilament surface, a loose cord has been proposed, wherein, as shown in FIG. 7, straight steel monofilaments (F) are loosely twisted together. Therefore, penetration of topping rubber can be improved and the surfaces of the filaments can be covered easier by the topping rubber because, when the cord tension is small, the gaps (G) between the filaments are sufficiently large and the topping rubber can easily penetrate the cord.

However, because of a very large elongation of such a loose cord under a small load, when loose cords are assembled in a raw tire as a belt and the tire inside is pressurized in the vulcanizing process, the belt tends to be elongated or deformed unevenly, which deteriorates tire uniformity and also decreases belt rigidity. As a results, steering stability, rolling resistance, tire life and the like are greatly decreased.

Further, if a tension is applied to the loose cord during rubberizing of the cord, the gaps between the filaments becomes narrow or closed, which results in the same problem of less rubber penetration.

SUMMARY OF THE INVENTION

The present inventors discovered that the problems of the rubber penetration can be solved by waving one or two of the three steel filaments in a 1X3 structure cord.

In this improved structure, however, as the three steel filaments form a triangular arrangement which is stable, the cord has a relatively high bending rigidity. As a result, ride comfort is somewhat deteriorated.

It is therefore, an object of the present invention to provide a pneumatic tire having a belt in which, in order to solve the above-mentioned problems, the penetration of rubber into belt cords is improved, and the cord elongation under a small load is decreased, and further the bending rigidity of the belt cords is decreased.

According to one aspect of the present invention, a pneumatic tire comprises a carcass extending between bead portions of the tire, and a belt disposed radially outside the carcass in a tread portion of the tire, the belt being made of cords embedded in topping rubber at an angle (theta) with respect to the tire equator, each of the belt cords comprising four steel monofilaments having the same diameters (d), wherein the diameter (d) is 0.2 to 0.35 mm, and the four steel monofilaments in one cord include one or two waved steel monofilaments and unwaved steel monofilaments, and the four steel monofilaments are compactly twisted together so as to make alternate contact portions and non-contact portions between each waved steel monofilament and the adjacent steel monofilaments.

As the steel monofilaments are compactly twisted together, the cord elongation under a small load becomes smaller than a loose cord.

As the twisted monofilaments include one or two waved monofilaments, the topping rubber easily penetrates the cord through the resultant gaps at the non-contact portions.

Further, so as to not form a rigid triangular arrangement, four filaments are used in one cord. Further, all the filaments, one or two of which are waved, have the same diameter. Therefore, the distance balance between the four filaments is disturbed, and the cord can be bent easier than the 1X3 cord.

BRIEF DESCRIPTION OF THE DRAWINGS

The embodiment of the present invention will be described in detail in conjunction with the accompanying drawings, in which.

DETAILED DESCRIPTION OF THE EMBODIMENTS

Figure 1:
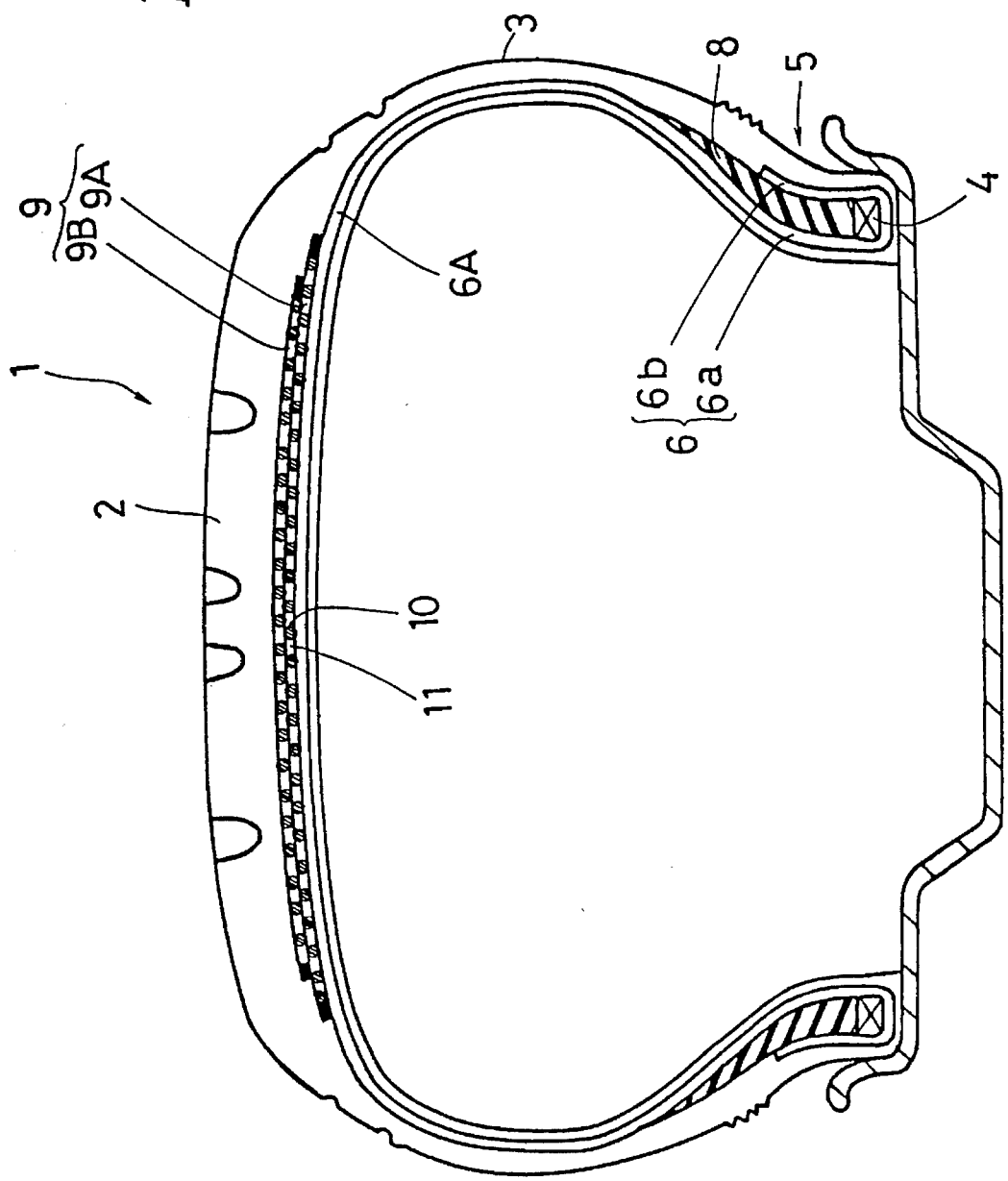
FIG. 1 is a cross sectional view of a tire according to the present invention.

In FIG. 1, a pneumatic tire 1 has a tread portion 2, a pair of bead portions 5, and a pair of sidewall portions 3 extending between the tread edges and the bead portions 5.

The tire 1 comprises a bead core 4 disposed in each bead portion 5, a carcass 6 extending between the bead portions 5 and turned up around the bead cores 4 to form two carcass turned up portions 6b and one main portion 6a, and at least one belt 9 (in this embodiment two belts 9A and 9B) disposed radially outside the carcass 6 in the tread portion 2.

The carcass 6 comprise at least one ply 6A of cords laid at 75 to 90 degrees with respect to the tire equator.

Between the carcass main portion 6a and each of the turned up portions 6b, a bead apex 8 made of hard rubber is disposed. The bead apexes extend taperingly radially outwardly from the bead cores 4 to reinforce the bead portion 5 and sidewall lower portion 3 and thereby to increase the lateral stiffness of the tire.

The carcass 6 in this embodiment is composed of one ply 6A of nylon fiber cords.

For the carcass, organic fiber cords, e.g. polyester, rayon, aromatic polyamide and the like, are preferably used. However, steel cords can be used.

In this embodiment, the radially inner belt 9A disposed on the carcass 6 is wider than the radially outer ply 9B disposed on the inner belt ply 9A. The belt 9 as the whole has enough width to reinforce the whole width of the tread portion 2.

Each of the belts 9A and 9B is made of parallel cords 10 embedded in topping rubber 11 and laid at an angle (theta) from 12 to 25 degrees with respect to the tire equator so that the cords in the inner belt 9A cross the cords in the outer belt 9B.

Figure 2:
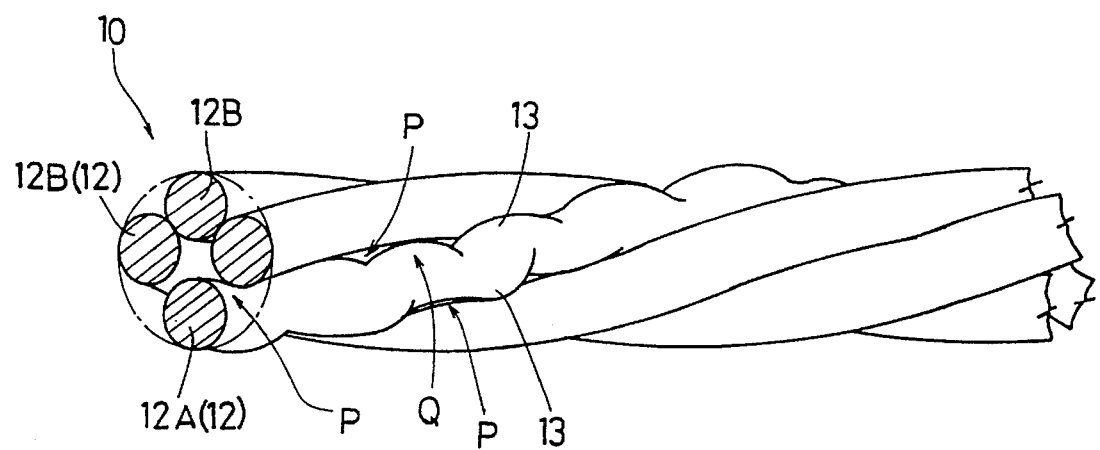
FIG. 2 is a perspective view of a cord used for the belt thereof.

In the present invention, the belt cords 10 is composed of only four steel monofilaments 12 which are twisted together as shown in FIG. 2, wherein one or two of the four steel monofilaments are waved, and the remaining three or two steel monofilaments are not waved.

In the example shown in FIG. 2, only one filament is waved. However, the belt cord 10 is preferably composed of two waved monofilaments 12A and two unwaved monofilaments 12B.

Figure 4:
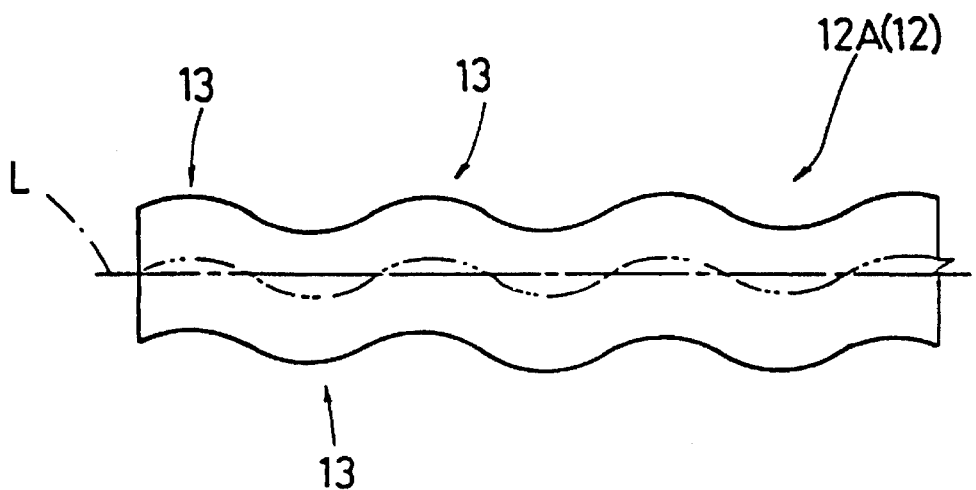
FIG. 4 is a plan view of a waved monofilament used in the belt cord.
Figure 5:
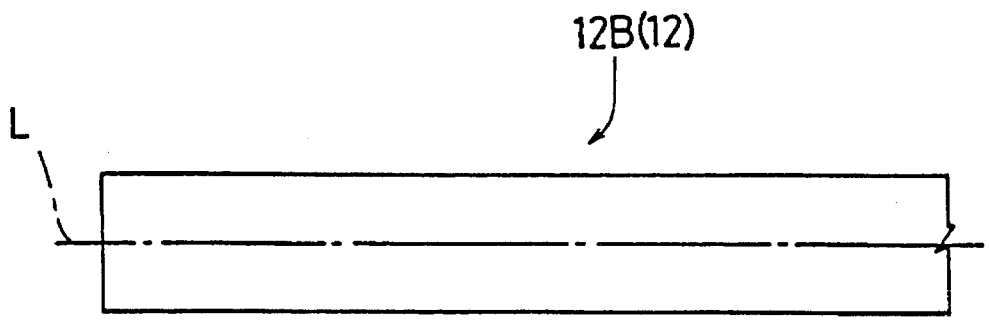
FIG. 5 is a plan view of an unwaved monofilament used in the belt cord.
Figure 6:
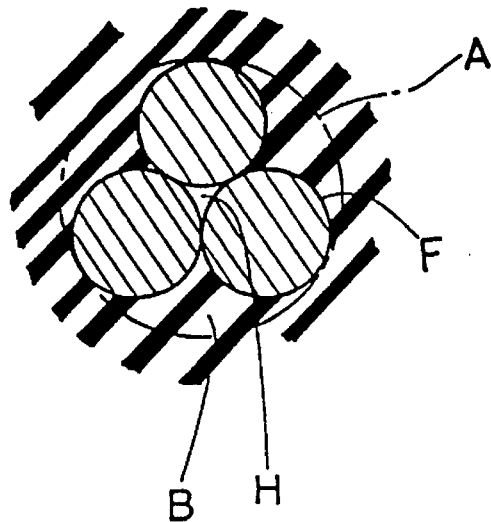
FIGS. 6 and 7 are cross sectional views of belt cords explaining the prior art.
Figure 7:
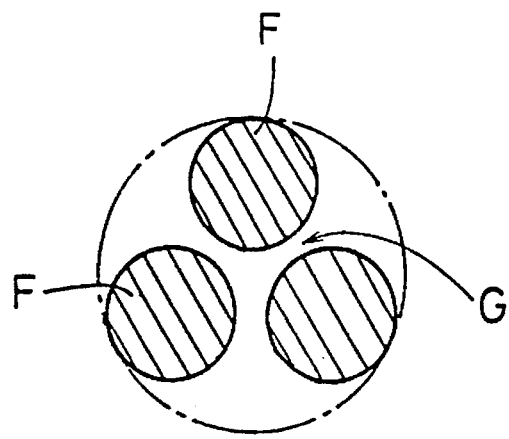

FIG. 4 and FIG. 5 show states of one waved monofilament 12A and one unwaved monofilament 12B, respectively, before they are twisted into a cord. As shown in FIG. 4, the waved monofilament 12A is waved in advance. As shown in FIG. 5, the unwaved monofilament 12B is straight.

The four monofilaments 12A and 12B in one cord have the same diameter (d).

Figure 3:
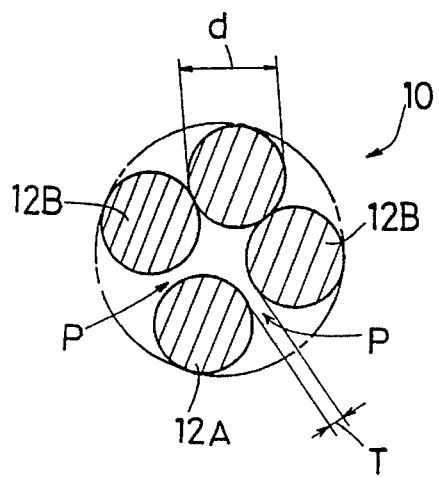
FIG. 3 is a cross sectional view of an opened part of the belt cord.

Accordingly, when they are twisted as shown in FIG. 2, the belt cord 10 is provided with non-contact portions P between the waved monofilament 12A and the adjacent monofilaments and along the length of the cord. That is, openings or gaps T are formed at each non-contact portion P as shown in FIG. 3, through which the topping rubber penetrates the central space of the cord.

The waved monofilament 12A can be waved two-dimensionally by bending a straight monofilament in a flat plane at small pitches.

Alternatively, the waved monofilament 12A can be waved three-dimensionally by coiling a straight monofilament at a small diameter and small pitches.

The wave pitches are preferably 0.31 to 0.70 times the cord twist pitches.

The wave height (from peak to peak) is preferably 1.5 to 2.5 times the diameter (d) of the filaments 12A and 12B and, in one embodiment, from greater than 1.8 to 2.5 times the diameter (d) of the filaments 12A and 12B.

In the present invention, the waved monofilament 12A and the unwaved monofilament 12B are twisted compactly so that the adjacent filaments contact each other. Accordingly, the elongation thereof becomes smaller than that of a loose cord.

The above mentioned gaps T at the non-contact portions P are not more than 0.6 times the diameter (d).

In order to improve the steering stability and tire uniformity, it is preferable that the elongation of the belt cord 10 under 5 kgf load is less than 0.3%.

To achieve this by providing a strength for the belt, the above-mentioned diameter (d) is set in the range from 0.20 to 0.35 mm, more preferably 0.25 to 0.28 mm.

If the diameter (d) is less than 0.2 mm, the cord is not provided with sufficient strength.

On the other hand, if the diameter (d) is more than 0.35 mm, the cord diameter and thereby the belt thickness increase and as a result the tire weight undesirably increase.

On the other hand, a rubber compound used as the topping rubber 11 has a complex elastic modulus $E^*$ of 45 to 150 kgf/sq.cm.

Here, the complex elastic modulus $E^*$ is measured under the following conditions: 10% initial strain, 10 Hz sine wave with 2% amplitude, and temperature of 70 degrees C., using a test piece (4 mm width, 30 mm length, and 2 mm thickness), by a visco-elasticity spectrometer manufactured by IWAMOTO SEISAKUSYO.

If the complex elastic modulus $E^*$ is less than 45 kgf/sq.cm, the belt rigidity becomes insufficient for steering stability, and the cut resistance of the belt cords during sharp cornering is decreased.

If the complex elastic modulus $E^*$ is more than 150 kgf/sq.cm, it becomes difficult for the topping rubber to penetrate the cord.

Further, the buckling strength coefficient K of each of the belts is more than 80 and less than 165, in other words, $80<K<165$ and, in one embodiment, $95<K<125$, and, in another embodiment, $97<K<120$. Here, the buckling strength coefficient K is defined by the cord count M per 5 cm width divided by $\sin(\theta)$. The angle ($\theta$) is the belt cord angle with respect to the tire equator, (12 deg$<\theta<$25 deg). If the buckling strength coefficient K is not more than 80, the cut resistance of the belt cord during sharp cornering and the steering stability are deteriorated. If the buckling strength coefficient K is not less than 165, ride comfort is deteriorated, and the tire weight increases.

Test tires of size 195/70R14 having the structure shown in FIG. 1 and specifications given in Table 1 were prepared and tested. The test results are also given in Table 1.

(1) Penetration of the topping rubber into the belt cord was measured as follows:

Four belt cords were taken out from the test tire. For each of the four belt cords, one of the four steel monofilaments therein was separated from the three others carefully not to remove the penetrated rubber using a sharp edged tool, and then the inner surfaces of the remaining three steel monofilaments were observed to determine whether the inner surfaces were exposed or not. Such determination was made every cord twisting pitch.

If the surface was exposed, it was determined the topping rubber did not penetrate such part (pitch). For each of the belt cords, the percentage of the penetrated parts (twist pitches) was calculated from the following equation:

$$\frac{\text{the number of the penetrated pitches} \times 100}{\text{the whole number of the pitches included in the cord}}$$

the whole number of the pitches included in the cord from the calculated four values in each test tire, the mean value thereof was obtained as the rubber penetration index for the tire.

(2) The resistance to corrosion of the steel belt cords of each of the test tires was measured as follows:

Eight holes reaching to the radially outer belt were provided in the inside of the test tire, and salt water was put into the tire hollow, and then the tire was run for 30,000 km at a speed of 60 km/h under a 120% of the standard tire load (the maximum load specified in JIS).

After the 30,000 km running, the area of the corroded part of the radially outer belt was measured as the resistance to corrosion, and indicated by an index based on that Reference tire 2 is 100. Therefore, the smaller the index, the better the resistance.

(3) The cut resistance was evaluated by the cut caused by sharp cornering of the test car.

In the Table, the cut resistance is indicated by an index based on that Reference tire 2 is 100. The larger the index, the better the resistance.

(4) The steering stability and ride comfort were evaluated by a test driver into five ranks, wherein the rank three is standard. The larger the value, the better the performance.

TABLE 1

| Tire | Ref. 1 | Ref. 2 | Ref. 3 | Ex. 1 | Ex. 2 | Ex. 3 | Ex. 4 | Ex. 5 | Ex. 6 |
|---|---|---|---|---|---|---|---|---|---|
| No. of steel nonofilaments | 5 | 4 | 4 | 4 | 4 | 4 | 4 | 4 | 4 |
| Filament dia. (mm) | 0.23 | 0.25 | 0.25 | 0.25 | 0.25 | 0.25 | 0.25 | 0.25 | 0.25 |
| Cord count (ends/5 cm) | 37 | 37 | 37 | 37 | 30 | 37 | 50 | 37 | 37 |
| Cord twist | compact | compact | loose | compact | compact | compact | compact | compact | compact |
| No. of waved monofilament | 0 | 0 | 0 | 1 | 1 | 2 | 1 | 1 | 1 |
| Cord elongation @ 5 kgf load (%) | 0.12 | 0.125 | 0.43 | 0.172 | 0.158 | 0.190 | 0.172 | 0.172 | 0.32 |
| Topping rubber complex elastic modulus (kgf/sq. cm) | 68 | 68 | 68 | 68 | 68 | 68 | 68 | 160 | 68 |
| Buckling strength coefficient | 120 | 120 | 120 | 120 | 97 | 120 | 171 | 120 | 120 |
| Rubber penetration (index) | 0 | 5 | 90 | 95 | 95 | 98 | 95 | 60 | 98 |
| Belt cord weight (g/tire) | 750 | 700 | 710 | 700 | 720 | 700 | 850 | 700 | 700 |
| Corrosion resistance | 120 | 100 | 25 | 20 | 20 | 18 | 20 | 40 | 18 |
| Cut resistance | 125 | 100 | 105 | 100 | 110 | 100 | 145 | 110 | 107 |
| Steering stability | 3.2 | 3.1 | 2.8 | 3.2 | 3.1 | 3.0 | 2.9 | 3.1 | 2.9 |
| Ride comfort | 2.8 | 2.9 | 3.2 | 3.2 | 2.9 | 3.1 | 2.7 | 3.0 | 3.0 |

We claim:

1. A pneumatic tire comprising a carcass extending between bead portions of the tire, and a belt disposed radially outside the carcass in a tread portion of the tire, said belt made of cords embedded in topping rubber at an angle ($\theta$) with respect to the tire equator, each said belt cord comprising four steel monofilaments having the same diameters (d), said diameter (d) being from 0.25 to 0.28 mm, said four steel monofilaments including one or two waved steel monofilaments (12A) and unwaved steel monofilaments (12B), said four steel monofilaments being compactly twisted together so as to make alternate contact portions and non-contact portions between each said waved steel monofilament (12A) and the adjacent steel monofilaments, the pitch of the wave of each said waved steel monofilament being 0.31 to 0.70 times the cord twist pitch, the buckling strength coefficient K of said belt satisfying the relationship 80<K<165, said buckling strength coefficient K being defined as the belt cord count per 5 cm width of the belt divided by sin $\theta$, and each said waved monofilament being waved three-dimensionally by coiling a straight monofilament at a small diameter, wherein the peak-to-peak wave height of each waved monofilament is from greater than 1.8 to 2.5 times the diameter (d).

2. The pneumatic tire according to claim 1, wherein a gap (T) between said four steel monofilaments at each non-contact portion is not more than 0.6 times said diameter (d).

3. The pneumatic tire according to claim 1, wherein the elongation of the belt cord under 5 kgf load is not more than 0.3%.

4. The pneumatic tire according to claim 1, wherein the topping rubber for the belt cords has a complex elastic modulus of 45 to 150 kgf/sq.cm.

5. The pneumatic tire according to claim 1, wherein each said belt cord is composed of two waved steel monofilaments (12A) and two unwaved steel monofilaments (12B).

6. The pneumatic tire according to claim 1, wherein the buckling strength coefficient K is from 95 to 125.

7. The pneumatic tire according to claim 1, wherein the buckling strength coefficient K is from 97 to 120.

* * * * *